US011754190B2

(12) United States Patent
Valera et al.

(10) Patent No.: US 11,754,190 B2
(45) Date of Patent: *Sep. 12, 2023

(54) SYSTEM AND METHOD FOR VALVE SEAT ARRANGEMENTS

(71) Applicant: Baker Hughes Oilfield Operations LLC, Houston, TX (US)

(72) Inventors: Lauren Valera, Houston, TX (US);
Jeremy Choate, Houston, TX (US);
Keith Adams, Katy, TX (US);
Mahesha Udipi, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/550,161

(22) Filed: Dec. 14, 2021

(65) Prior Publication Data

US 2022/0120350 A1 Apr. 21, 2022

Related U.S. Application Data

(63) Continuation of application No. 17/071,699, filed on Oct. 15, 2020, now Pat. No. 11,199,270.

(51) Int. Cl.
*F16K 3/20* (2006.01)
*F16K 5/06* (2006.01)
(Continued)

(52) U.S. Cl.
CPC ............. *F16K 3/207* (2013.01); *F16K 3/20* (2013.01); *F16K 5/0673* (2013.01);
(Continued)

(58) Field of Classification Search
CPC ...... F16K 3/0236; F16K 3/0227; F16K 3/207; F16K 3/20; F16K 5/0678; F16K 5/0673; F16K 5/0689; F16K 5/201; F16K 5/205
See application file for complete search history.

(56) References Cited

U.S. PATENT DOCUMENTS 3,114,386 A * 12/1963 Dumm ................. F16K 5/0678
251/315.08
3,305,213 A 2/1967 Grove
(Continued)

OTHER PUBLICATIONS

International Search Report and Written Opinion dated Jan. 27, 2022 in corresponding PCT Application No. PCT/US2021/071820.

*Primary Examiner* — David Colon-Morales
(74) *Attorney, Agent, or Firm* — HOGAN LOVELLS US LLP

(57) ABSTRACT

A valve assembly includes a valve body and a valve member extending through at least a portion of the valve body. The valve assembly also includes a seat pocket forming an annular recess in the valve body and a seat arrangement positioned at least partially within the seat pocket. The seat arrangement includes a lower seat extending radially inward from the annular recess toward the valve cavity axis. The seat arrangement also includes an upper seat at least partially overlapping the lower seat, the upper seat extending radially inward toward the valve cavity axis to contact the valve member along a seat face. The seat arrangement further includes an interface seal positioned along an interface between the upper seat and the lower seat, the interface seal receiving a fluid pressure to drive the lower seat radially outward and into the annular recess.

17 Claims, 9 Drawing Sheets

(51) Int. Cl.
*F16K 5/20* (2006.01)
*F16K 3/02* (2006.01)

(52) U.S. Cl.
CPC .......... *F16K 3/0236* (2013.01); *F16K 5/0689* (2013.01); *F16K 5/201* (2013.01); *F16K 5/205* (2013.01)

(56) References Cited

U.S. PATENT DOCUMENTS

| | | | | |
|---|---|---|---|---|
| 3,760,833 A * | 9/1973 | Kemp | ................. | F16K 5/205 137/246.22 |
| 3,771,545 A | 11/1973 | Allen | | |
| 4,401,292 A | 8/1983 | Whaley | | |
| 4,878,641 A | 11/1989 | Vogt | | |
| 4,878,651 A | 11/1989 | Meyer | | |
| 5,090,661 A * | 2/1992 | Parks, Jr. | ............. | F16K 3/0227 251/174 |
| 5,201,872 A * | 4/1993 | Dyer | ................. | F16K 3/0236 251/328 |
| 5,341,835 A * | 8/1994 | Lanning, II | ........... | F16K 3/0227 137/246.22 |
| 5,494,256 A | 2/1996 | Beson | | |
| 5,533,738 A | 7/1996 | Hoffmann | | |
| 7,004,452 B2 | 2/2006 | Chatufale | | |
| 7,562,859 B2 | 7/2009 | Lam | | |
| 8,662,473 B2 | 3/2014 | Comeaux | | |
| 8,973,897 B2 * | 3/2015 | Cordova | ................. | F16K 3/02 251/327 |
| 9,915,359 B2 * | 3/2018 | Ricard | ................. | F16K 5/0673 |
| 10,378,659 B2 | 8/2019 | Scott | | |
| 11,199,270 B1 * | 12/2021 | Valera | ................. | F16K 5/0673 |
| 2019/0085986 A1 | 3/2019 | Hicks | | |
| 2020/0393050 A1 * | 12/2020 | Laverty | ................. | F16K 5/0673 |

* cited by examiner

SYSTEM AND METHOD FOR VALVE SEAT ARRANGEMENTS

CROSS REFERENCE TO RELATED APPLICATIONS

This application is a continuation of U.S. patent application Ser. No. 17/071,699, filed Oct. 15, 2020, now U.S. Pat. No. 11,199,270, issued Dec. 14, 2021, the full disclosure of which is hereby incorporated by reference herein for all purposes.

BACKGROUND

1. Field of Invention

This disclosure relates in general to valve assemblies, and in particular, to systems and methods for valve seat arrangements.

2. Description of the Prior Art

Valves maybe used in a variety of industries and in multiple different services conditions. As an example, hydraulic fracturing operations may be deemed a severe service where the fluid associated with the valves may be corrosive or include particulate matter, while also operating at high pressures. As a result, various components of the valves may wear out rapidly, increasing costs for producers. Pocket erosion, in particular, may lead to wash out within body cavities that subsequently lead to costly repairs or valve replacements. Pocket erosion may occur when the corrosive and/or erosive fluids are directed toward a pocket or groove where the valve seat is positioned.

SUMMARY

Applicant recognized the problems noted above herein and conceived and developed embodiments of systems and methods, according to the present disclosure, for valves and valve assemblies.

In an embodiment, a valve assembly includes a valve body and a valve member extending through at least a portion of the valve body, the valve member being movable along a valve cavity axis between an open position and a closed position. The valve assembly also includes a seat pocket formed in the valve body, the seat pocket forming an annular recess in the valve body, and a seat arrangement positioned at least partially within the seat pocket. The seat arrangement includes a lower seat extending radially inward from the annular recess toward the valve cavity axis. The seat arrangement also includes an upper seat at least partially overlapping the lower seat, the upper seat extending radially inward toward the valve cavity axis to contact the valve member along a seat face. The seat arrangement further includes an interface seal positioned along an interface between the upper seat and the lower seat, the interface seal receiving a fluid pressure to drive the lower seat radially outward and into the annular recess.

In an embodiment, a seat arrangement for a valve assembly includes a lower seat, the lower seat adapted for a seat pocket formed within a valve body, the lower seat having a first lower seat end and a second lower seat end, the second lower seat end having a platform and seal recess for receiving a seat pocket seal, wherein the lower seat has a lower seat profile extending from the first lower seat end toward the second lower seat end. The seat arrangement also includes an upper seat, the upper seat adapted to at least partially overlap the lower seat, the upper seat having a seat face substantially proximate the first lower seat end and a mating upper seat profile. A gap formed between the upper seat and the lower seat is configured to receive a fluid pressure that bears against an interface seal.

In an embodiment, a method for installing a seat arrangement includes providing a two part seat arrangement, the two part seat arrangement including a lower seat and an upper seat, each of the lower seat and the upper seat having a respective mating profile. The method also includes positioning the lower seat at least partially within a seat pocket formed in a valve body. The method further includes positioning the upper seat to at least partially overlap the lower seat. The method also includes engaging a valve member with at least the upper seat. The method further includes sealing the two part seat arrangement within the valve body.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

Figure 1:
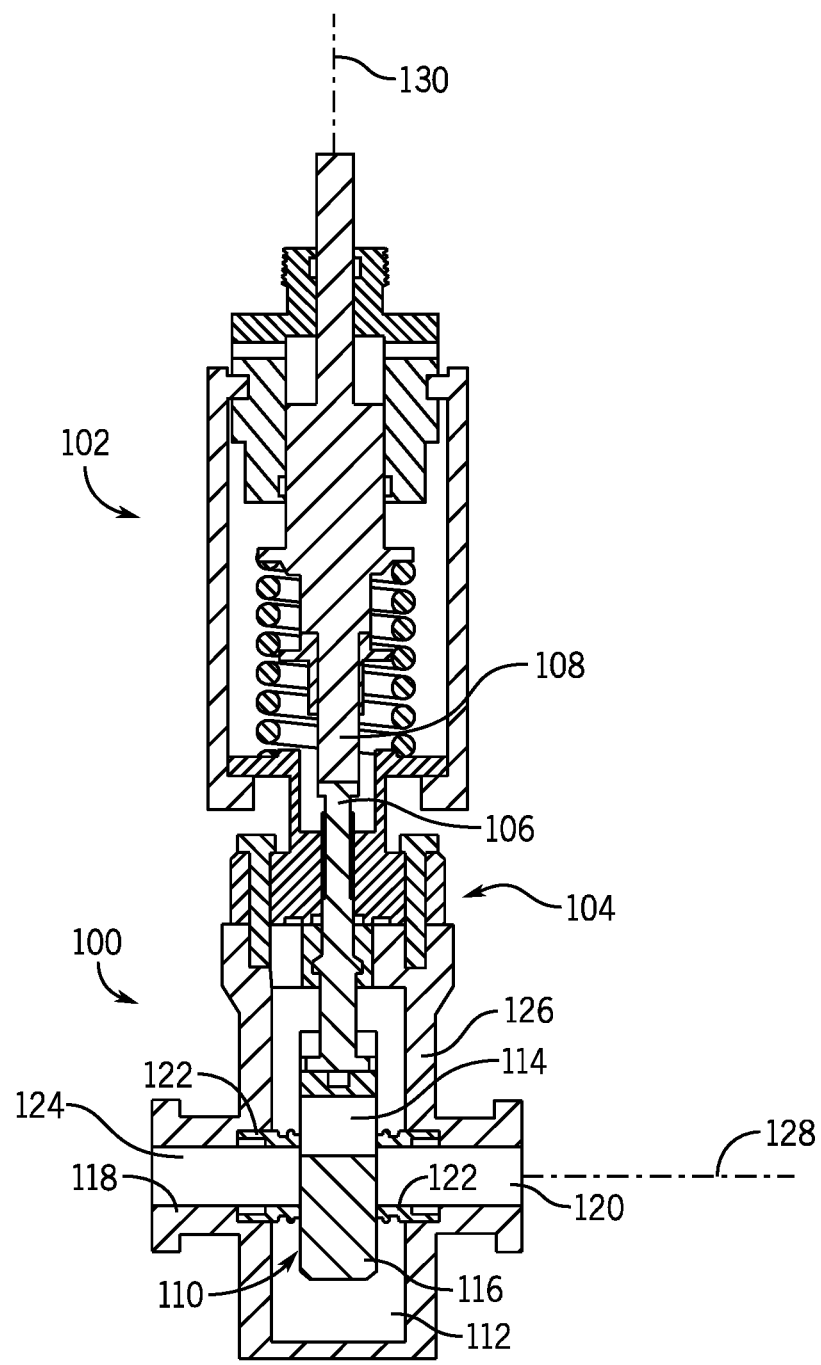
FIG. 1 is a schematic cross-sectional view of an embodiment of a valve assembly.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure are directed toward a seat arrangement for valves, such as for valves in severe service. The seat arrangement may include a dual seat configuration where a lower secondary seat is overlapped by an upper primary seat. Moreover, the seat arrangement may include a dual seat configuration with a lower primary seat and an upper secondary seat. The seat arrangement may be utilized with a variety of valve types, such as gate valves, ball valves, globe valves, plug valves, and the like. Embodiments are directed toward the seat arrangement to reduce a likelihood of seat pocket washout. During flow conditions, the lower seat is pushed against the seat pocket, while the upper primary seat stays in contact with the gate/ball/valve member. Seat pocket erosion is thereby reduced, body cavity washout is also reduced, and less grease may be used for valve operations. Because of the arrangement, a gap or interface between the seats may serve as the main erosion point. Accordingly, the components of the valve seat may be considered sacrificial to reduce the likelihood of damage to the valve body, which may be considerably more expensive to repair or replace.

Embodiments of the present disclosure overcome problems associated with traditional seat arrangements that are subject to seat pocket erosion. The present embodiments provide a simple, rugged seat design with staggered seal assist. As a result, embodiments may reduce seat pocket erosion on both the upstream and downstream side of the valve member. As will be described, while the upper overlapping seat may maintain contact with the valve member, the lower seat may maintain contact with the seat pocket to block corrosive/erosive fluid from the seat pocket. Accordingly, seat pocket outwash may be reduced due to forming the seats as sacrificial components.

FIG. 1 is a cross-sectional side elevation view of an embodiment of a valve assembly 100 that includes an actuator 102 coupled to a bonnet 104. It should be appreciated that while the illustrated actuator 102 is an automated or controlled actuator, that manual operators may also be utilized within the scope of the present disclosure. The illustrated actuator 102 is coupled to a valve stem 106, via a connector 108 that extends through a central bore and couples to a valve member 110 arranged within a chamber 112. The valve member 110 reciprocates along a valve cavity axis 130 to move between an open position and a closed position. The illustrated valve member 110 includes a passage 114 and a block 116. As shown, fluid (e.g., gas, liquid, solid, or a combination thereof) may enter the valve 100 through an inlet passage 118 and engage the valve member 110 en route to an outlet passage 120. In the illustrated embodiment, the valve member 110 is transitioning between an open position, in which the passage 114 is substantially aligned with the inlet passage 118 and the outlet passage 120, and a closed position, in which the block 116 is substantially aligned with the inlet passage 118 and the outlet passage 120. The illustrated valve member 110 may seal against valve seats 122.

In operation, a bore 124 extends through a valve body 126 along a valve body axis 128. The fluid is at a pressure and travels through the bore 124, for example, when the valve member 110 is positioned in an open position. During operation, as fluid flows through the bore 124, pressure may drive the valve member 110 against the seat 122 (e.g., a downstream seat). This may be referred to as downstream seating. Downstream seating may offer certain advantages such as reduced forces for opening the valve member 110. However, upstream seating may also be utilized, which may prevent undesirable components of the flow from entering the chamber 112. It should be appreciated that various forces may be applied to the seats 122 in a variety of different operating conditions. Embodiments of the present disclosure are directed toward a dual seat arrangement that enables constant contact with both the gate and seat pocket. Accordingly, sealing pressures are maintained while also preventing build up in seat pocket, which may lead to valve failures. Embodiments are also directed toward replaceable components, which may also be retrofit into existing valves, to reduce seat pocket erosion and grease usage.

Figure 2:
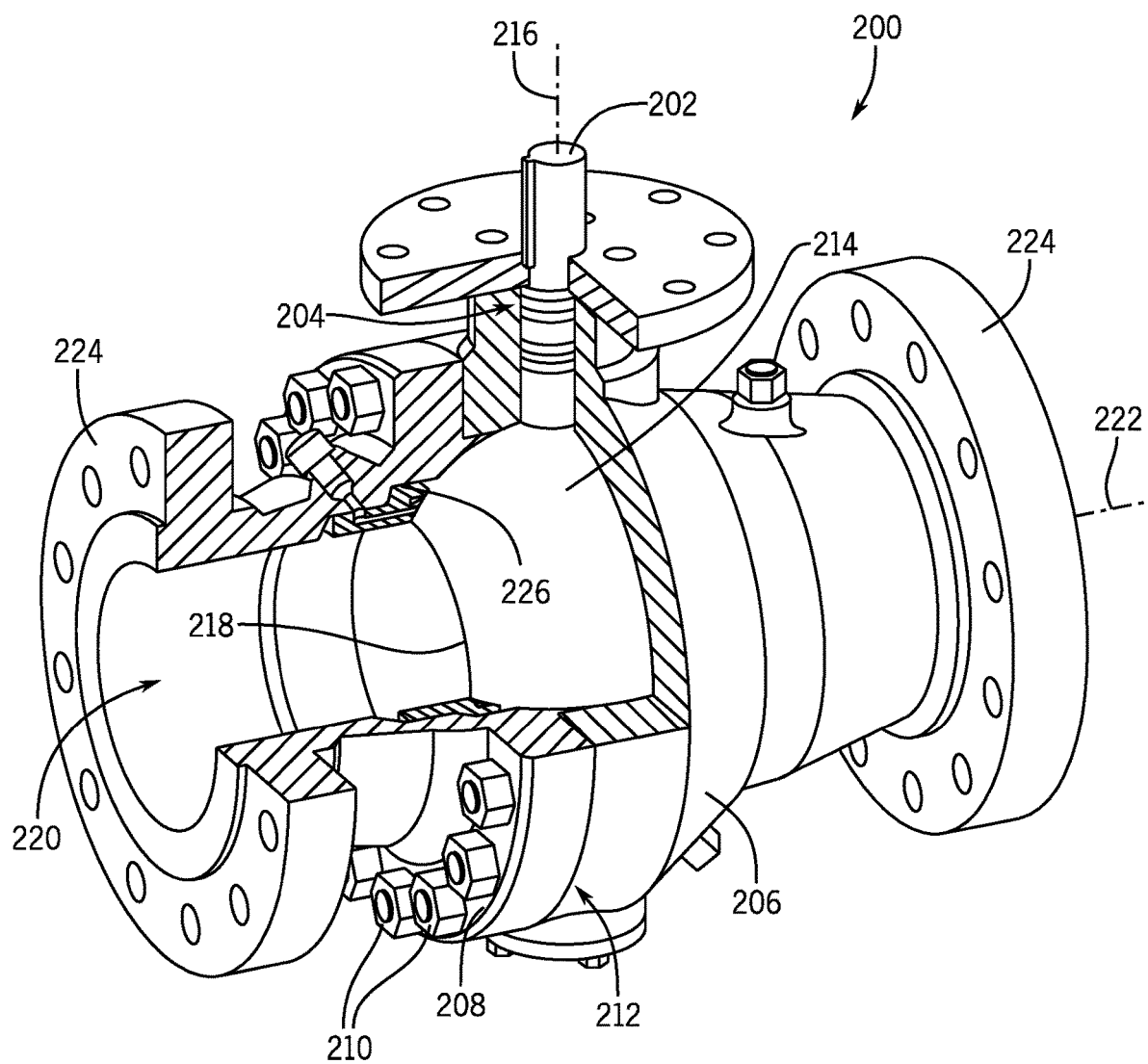
FIG. 2 is a partial cross-sectional view of an embodiment of a valve assembly.

FIG. 2 is a partial sectional view of an embodiment of a valve 200, which is a ball valve in the illustrated embodiment. The ball valve 200 includes a stem 202 extending through a bore 204 formed in a body 206 (e.g., body end, body portion). The body 206 is coupled to a tail 208 (e.g., tail end, tail portion) via a plurality of fasteners 210, which are illustrated as bolts in FIG. 2. The body 206 and tail 208 are joined at an interface 212. The valve 200 further includes a ball body 214 coupled to the stem 202. The ball body 214 rotates about a longitudinal axis 216 in response to rotation of the stem 202. In embodiments, the valve 200 may be a quarter turn valve, which enables fast opening and closing of the valve 200. The ball body 214 includes an opening 218 that is aligned with a flow passage 220 having a flow axis 222. The illustrated ball body 214 is in an open position such that the opening 218 is aligned with the flow passage 220 extending through the body 206 and the tail 208. In the closed position, which is not illustrated, the opening 218 may be arranged substantially 90 degrees from the current position such that flow through the flow path 218 is blocked. It should be appreciated that while the illustrated valve 200 includes coupling ends 224 having flanges, that in other embodiments, the coupling ends 224 may be threaded, prepped for welding, or other reasonable coupling ends.

As discussed above with respect to the valve assembly 200, valve seats 226 may be arranged within the flow passage 220 to provide a sealing surface against the ball body 214. These valve seats 226 face similar changes discussed above with respect to the gate valve, as fluid and/or particulates may flow into the seat pocket, which may cause washing out of the body 206 and/or the tail 208. This is undesirable, as these components are larger and more expensive than other components, such as the seats 226. Embodiments may be directed toward the dual seat arrangement that may also be utilized with respect to ball valves, in addition to gate valves, and variety of other valve types. Embodiments provide for overlapping seats where a seat may press against the ball body 214 while another presses against the seat pocket, thereby providing a sealing configuration that reduces a likelihood of damage to the seat pocket and/or the valve body.

Figure 3A:
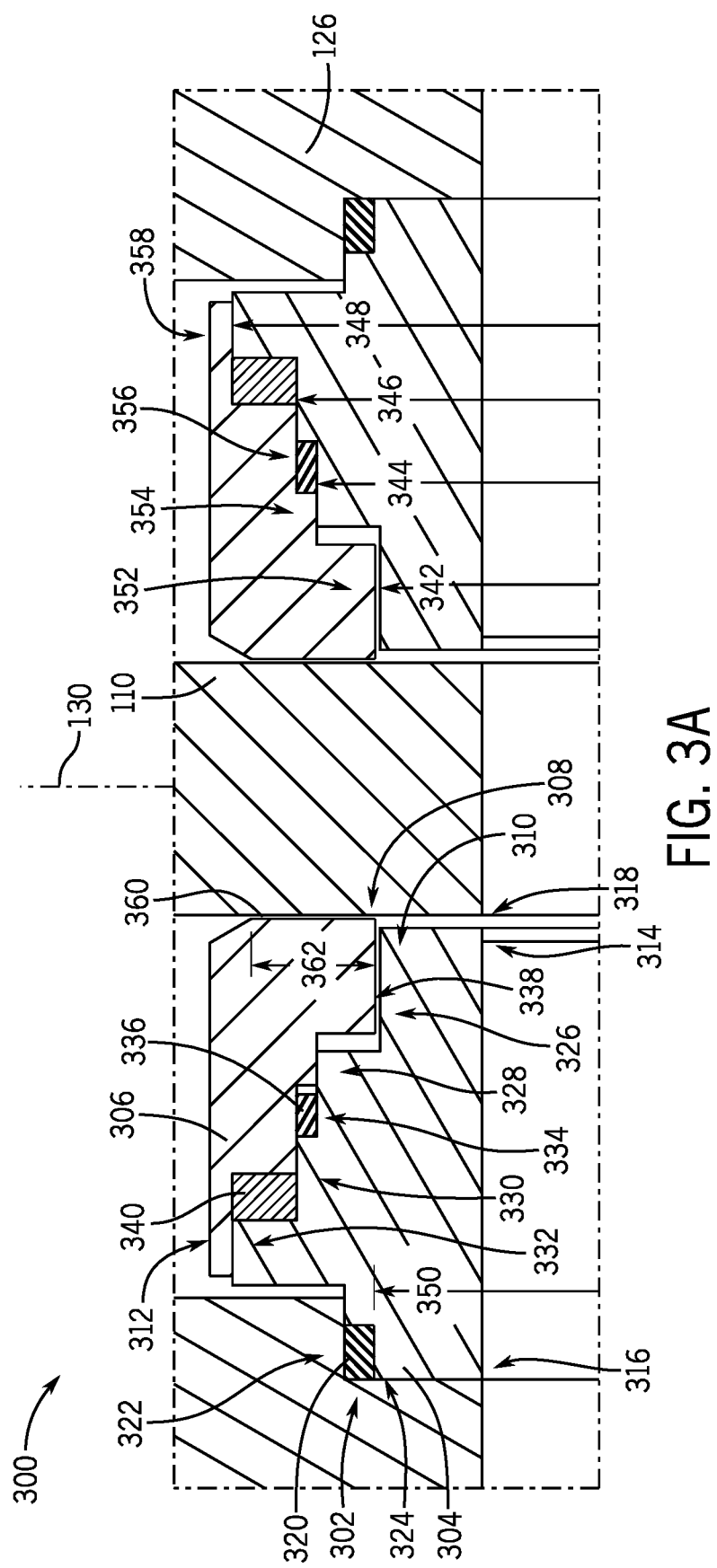
FIGS. 3A and 3B are cross-sectional views of an embodiment of a seat arrangement, in accordance with embodiments of the present disclosure.
Figure 3B:
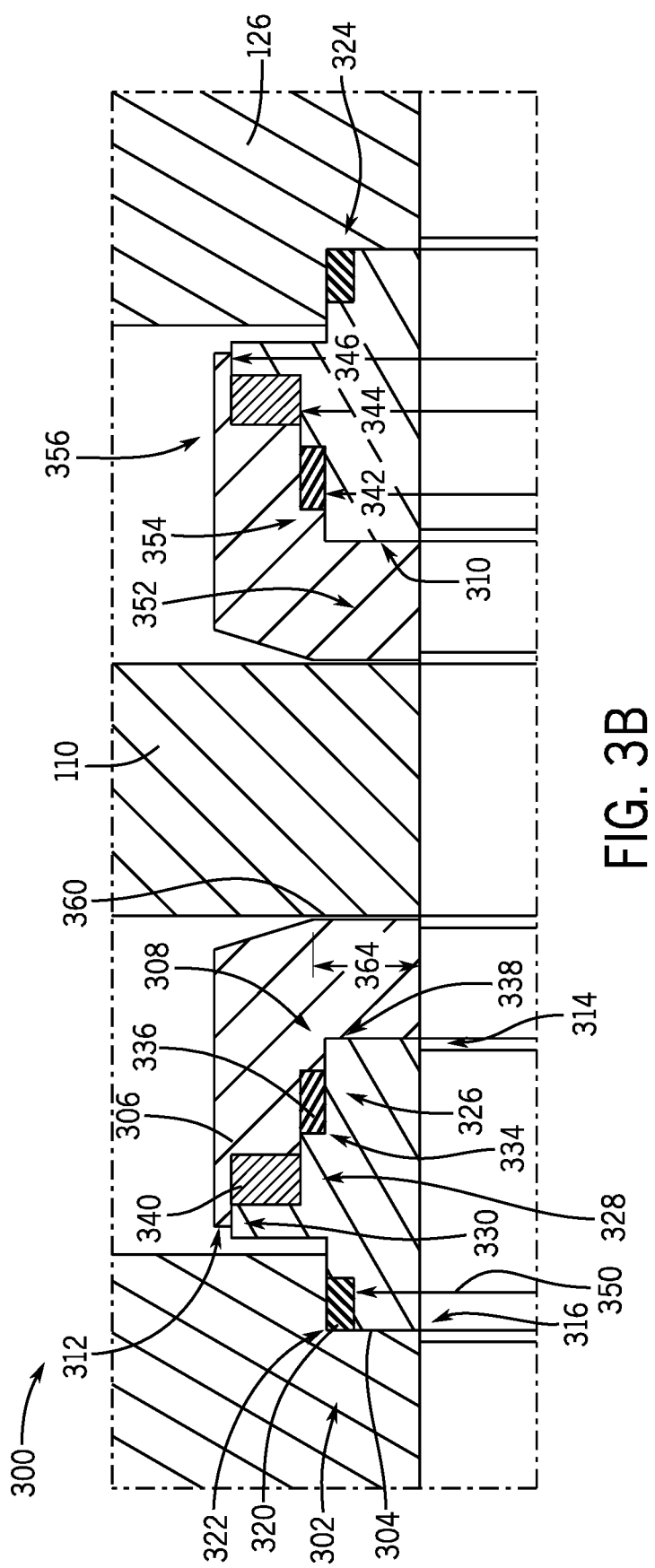

FIGS. 3A and 3B are cross-sectional side views of embodiments of a seat arrangement 300 utilized with the valve assembly 100, which is illustrated as a gate valve having the valve member 110. In this example, the valve member 110 extends through the valve body 126 to reciprocate between an open position and a closed position along the valve cavity axis 130. In this example, the valve body 126 includes a seat pocket 302 that receives the seat arrangement 300. As will be described herein, the seat arrangement 300 includes a dual seat configuration that provides an upper seat and a lower seat. It should be appreciated that the seats may also be referred to as inner and outer seats, respectively, where an inner seat maintains contact with the valve member 110 and the outer seat is driven into the pocket 302, as will be described below. The upper seat maintains contact with the valve member 110 while the lower seat is driven into the seat pocket 302, against the valve body 126, to reduce a likelihood of seat pocket erosion.

The illustrated seat arrangement 300 is a dual seat configuration that may be formed from two, separate, removable seats. A lower seat 304 (e.g., a first seat, a pocket seat, etc.) is positioned in contact with an upper seat 306 (e.g., a second seat, a valve member seat, etc.). The seats 304, 306 are arranged with a substantially mating interface 308 formed by a lower seat stepped profile 310 and an upper seat stepped profile 312. It should be appreciated that the interface 308 does not provide a direct alignment in the illustrated embodiment, but rather, includes gaps and pockets to receive seals, springs, or the like. As will be described below, one or more gaps may be arranged to facilitate fluid pressure to enter the interface 308 to drive components of the seat arrangement 300 against the seat pocket and/or valve member.

The lower seat 304 is positioned within the seat pocket 302 and includes a first lower seat end 314 (e.g., a valve member end, a lower seat valve member end) and a second lower seat end 316 (e.g., a pocket end, a lower seat pocket end). In this example, the first lower seat end 314 is positioned closer to the valve member 110 and the second lower seat end 316 is arranged within the seat pocket 302. The example in FIG. 3A further includes a gap 318 between the lower seat 304 and the valve member 110, but it should be appreciated that the lower seat 304 may move into contact with the valve member 110 in various embodiments due to flow conditions. In other words, the gap 318 may not be continuously maintained during operation of the valve. Additionally, in certain embodiments, the gap 318 may form at least a portion of a flow path to direct fluid between toward the interface 308.

In the embodiments shown in FIGS. 3A and 3B, a seat pocket seal 320 is positioned in a seal recess 322 formed at the second lower seat end 316. The seat pocket seal 320 may block fluid flow from entering the seat pocket 302 in combination with other features of the present disclosure. As will be described below, the seat pocket seal 320 is an annular seal that that has a diameter that is, at least partially, controlled by dimensions of the lower seat 302. It should be appreciated that changes in the seat pocket seal 320 diameter may affect one or more operating conditions of the seat arrangement 300, as will be described below. In this example, the seat pocket seal 320 is formed along a platform 324 at the second end 316. The illustrated seal recess 322 is formed opposite the mating interface 308 such that the seal recess 322 does not form a portion of the mating interface 308, but it should be appreciated that different configurations may adjust the position of the seal recess 322.

Turning to FIG. 3A, the lower seat profile 310 is shown as a stepped profile that includes a first lower seat step 326, a second lower seat step 328, a third lower seat step 330, and a fourth lower seat step 332. As shown, the first lower seat step 328 is closer to the valve member 110 than the second lower seat step 330, and so forth. In this example, a second seal recess 334 is formed at the second lower seat step 330. An interface seal 336 is positioned within the second seal recess 334 and may be utilized to drive the lower seat 304 into the seat pocket 302. That is, fluid may flow into the interface 308 along a flow path 338 and contact the seal 336, which may apply a force against the lower seat 304, driving the lower seat radially outward from the axis 128 and into the seat pocket 302. As a result, corrosive or erosive fluid may be directed toward the seat arrangement 300, rather than into the seat pocket 302. Accordingly, the components of the seat arrangement 300 may be considered sacrificial. However, these components may also be cheaper and easier to replace, which is preferable to replacing or repairing the valve body.

The illustrated third lower seat step 330 receives a biasing member 340, which in this configuration is a spring. The biasing member 340 may exert a force against the upper seat 306, which may drive the upper seat 306 into the valve member 110, which maintains a sealing force. The illustrated fourth lower valve seat 332 is shown being overlapped by a portion of the upper seat 306. It should be appreciated that this configuration is for illustrative purposes only, and in various embodiments, the upper seat 306 may abut the fourth lower seat step 332, fit into a recess or slot formed within the fourth lower seat step 332, or the like.

In this example, each of the respective steps 326-332 are at different respective diameters (e.g., heights with respect to an inner diameter of the seat). For example, a first diameter 342 is less than a second diameter 344, which is less than a third diameter 346, which is less than a fourth diameter 348. In embodiments, the respective diameters and steps may be referred to as having "heights" with respect to an inner diameter of the lower seat 304. Additionally, in this configuration, the seal recess 322 is arranged at a second end diameter 350 that is greater than the first diameter 342. It should be appreciated that such configurations are for illustrative purposes only and the diameters may vary and be particularly selected based on expected operating conditions. Moreover, there may be more steps. Additionally, as shown in FIG. 3B, there may be fewer steps. In the configuration shown in FIG. 3B, the fourth lower seat step 332 has been omitted.

The seat arrangement 300 further includes the upper seat 306, which is positioned to mate with and/or at least partially overlap the lower seat 304. The upper seat 306 includes the upper seat profile 312, which is also shown as a step profile that substantially confirms to the lower seat profile 310. In this configuration, the upper seat profile includes a first upper seat step 352, a second upper seat step 354, a third upper seat step 356, and a fourth upper seat step 358. In various embodiments, the mating interface 308 may be formed by contact between the respective steps. Moreover, at least a portion of the second seal recess 334 may be formed by the second upper seat step 354 or the third upper seat step 356, as shown in FIGS. 3A and 3B. Furthermore, as noted above, the fourth upper seat step 358 may overlap the fourth lower seat step 332.

Turning to the embodiment illustrated in FIG. 3A, the upper seat 306 includes a seat face 360 that contacts the valve member 110. In this example, the seat face 360 is driven radially inward toward the valve member 110 by the biasing member 340. Accordingly, a seal may be formed at the seat face 360 to block fluid flow past the valve member 110. In the configuration shown in FIG. 3A, the seat face 360 extends for a first seat face length 362 and is seated on the first lower seat step 326. In various embodiments, the seat face 360 is shown extending farther radially inward than the lower seat 304, but it should be appreciated that the lower seat 304 may contact the valve member 110 in certain embodiments.

FIG. 3B illustrates a configuration where the upper seat 306 fully overlaps the lower seat 304 such that the first upper seat step 352 is not aligned with the first lower seat step 326. In other words, the illustrated upper seat 306 fully blocks the lower seat 304 from engaging the valve member 110. The illustrated seat face 306 includes a second seat face length 364, which is larger than the first seat face length 362. The biasing member 340 still drives the upper seat 306 toward the valve member 110 while pressure at the interface seal 336 drives the seat pocket seal 320 into the seat pocket 302. It should be appreciated that selection between the configurations shown in FIGS. 3A and 3B may depend on a variety of factors. For example, there may be less contact pressure in the configuration shown in FIG. 3B due to the increased area of the seat face 360. Decreasing the contact pressure may reduce the wear and tear on the seat, however, a reduced pressure may provide a less effective seal.

In operation, the valve member 110 will translate axially along the valve body axis 128 to engage the upper seat 306. The upper seat 306 may wear over time due to the contact with the valve member 110 and/or the properties of the fluid within the valve. Embodiments of the present disclosure are directed toward a removable seat arrangement 300 that may preferentially erode or corrode in favor of damage to the valve body, which may be more expensive and time consuming to repair.

As noted above, in various embodiments one or more dimensions of the lower seat 304 and/or the upper seat 306 may be modified in order to adjust operation of the seat arrangement 300. By way of example, the illustrated seat pocket seal 320 has a smaller diameter than the interface seal 336. As a result, a greater force is applied at the interface seal 336, which drives the lower seat 304 into the seat pocket. In certain embodiments, this may also determine whether the seat arrangement 300 operates as an upstream sealing seat or a downstream sealing seat. For example, pressuring the seat arrangement 300 may cause one or more components to shift, which may adjust how sealing occurs within the valve, as will be described below.

Figure 4A:
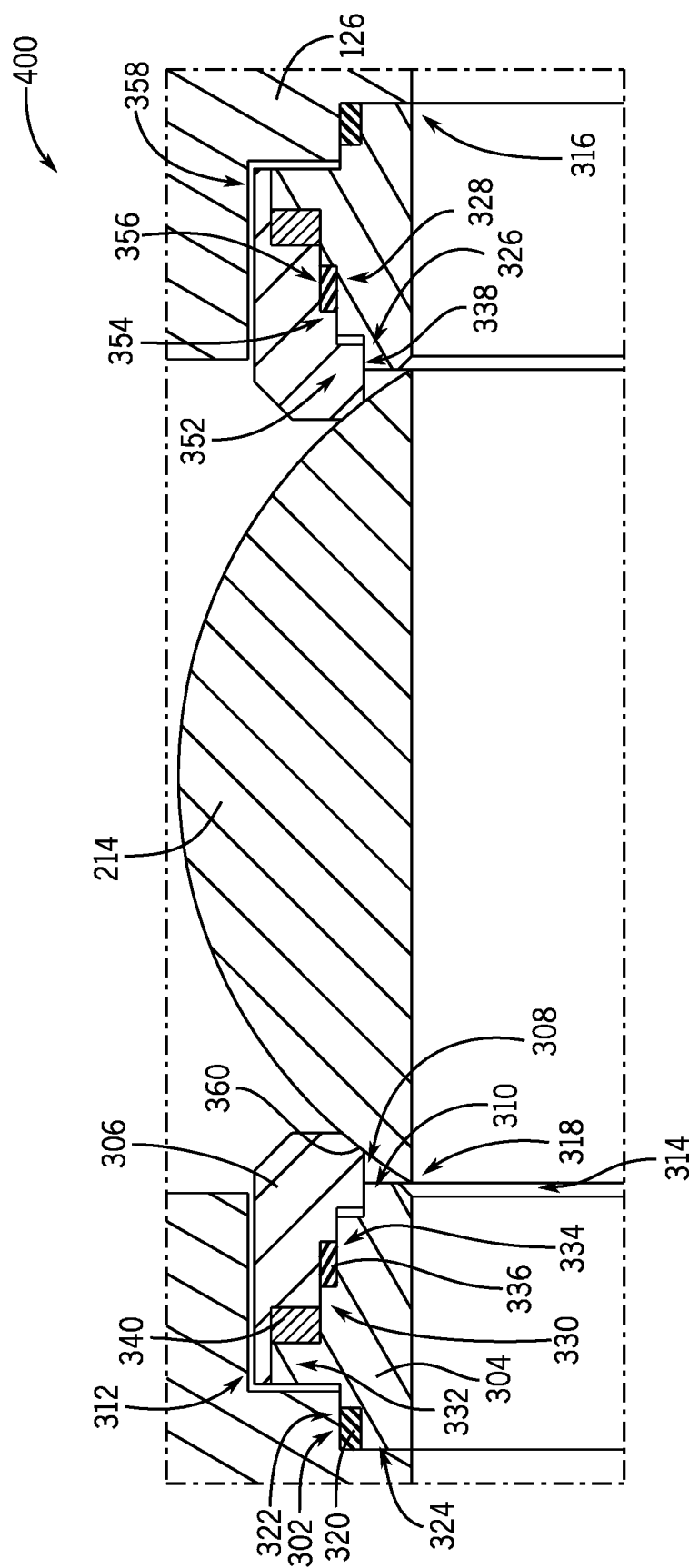
FIGS. 4A and 4B are cross-sectional views of an embodiment of a seat arrangement, in accordance with embodiments of the present disclosure.
Figure 4B:
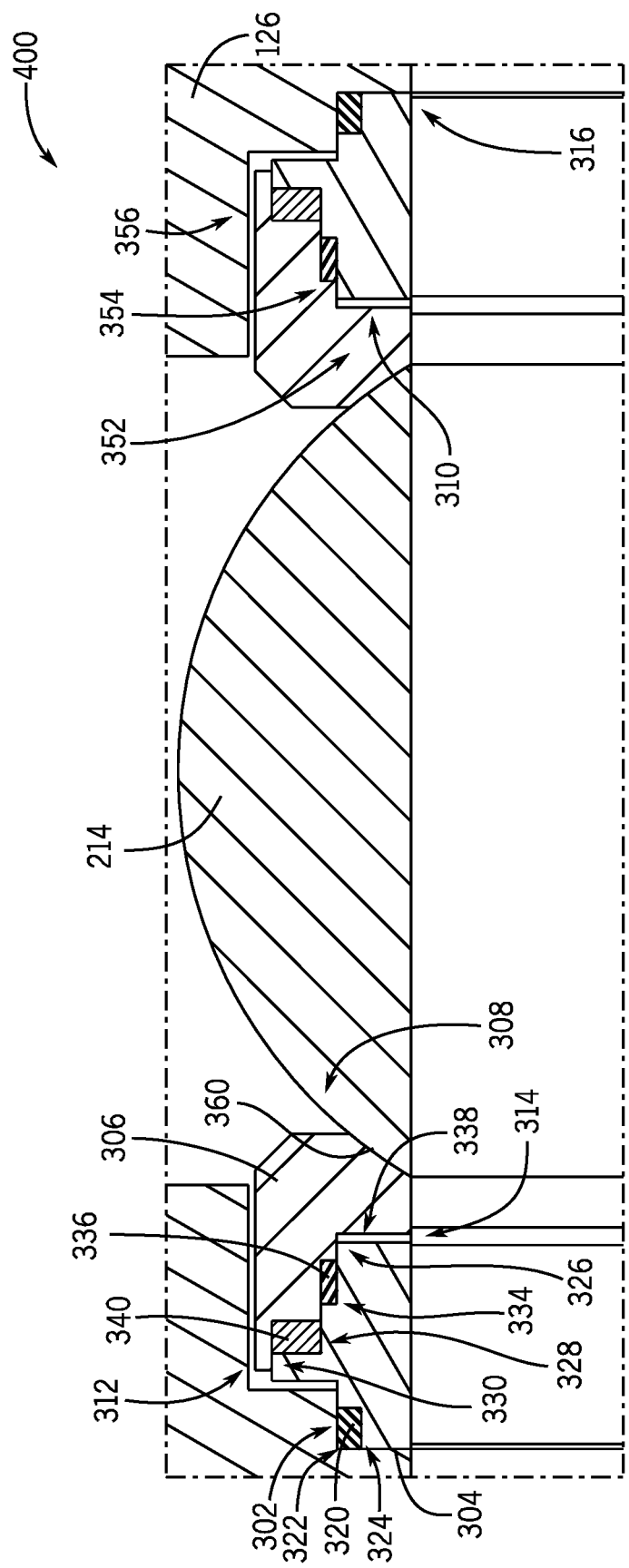

FIGS. 4A and 4B are cross-sectional side views of embodiments of a seat arrangement 400 utilized with the valve assembly 200, which is illustrated as a ball valve. It should be appreciated that several features may be shared between the seat arrangement 400 and the seat arrangement 300. While like numerals may be used for similar components, it should be appreciated that the use of like numerals are for illustrative and convenience purposes and is not intended to be limiting. In this configuration, the seat arrangement 400 includes the lower seat 304 and the upper seat 306. The mating interface 308 between the upper seat 306 and the lower seat 304 is formed by the lower seat profile 310 and the upper seat profile 312, which both includes steps to provide various shoulders for force transmission, as well as a providing a tortuous flow path for fluids between the seats 304, 306.

As noted above, the upper seat 306 is driven radially inward to contact the ball body 214 via the biasing member 340, which is illustrated as a spring in FIGS. 4A and 4B. The upper seat 306 of FIG. 4A does not fully block the lower seat 304 from the ball body 214, similar to the configuration of FIG. 3A, while the upper seat 306 does fully overlap the lower seat 304 in FIG. 4B. Accordingly, respective seat faces 360 may have different sealing areas, which may reduce a force applied to the ball body 214.

The configuration shown in FIGS. 4A and 4B further illustrates the lower seat 304 driven into the seat pocket 302 via pressure applied at the interface seal 336. In various embodiments, as noted above, the size of the steps may vary, and as a result, the size of the interface seal 336 may also vary. In certain embodiments, the interface seal 336 may be larger than the seat pocket seal 320 (e.g., have a larger diameter), which may facilitate the force applied to the lower seat 304 to drive the lower seat 304 into the seat pocket 302. It should be appreciated that the configuration may be changed such that the seat pocket seal 320 is larger (e.g., has a larger diameter) in order to generate an upstream sealing valve, as an example.

In operation, the upper seat 306 is driven against the ball body 214 while the lower seat 304 is driven into the seat pocket 302. As a result, fluid and particulates within the fluid may be blocked from flowing into the seat pocket 302, which may reduce the likelihood of wash out. In certain embodiments, the seat arrangement 400 may be considered as sacrificial components that preferentially wear out before the valve body. As a result, repairs may be easier and cheaper because smaller, cheaper components will be replaced instead of the valve body.

Figure 5:
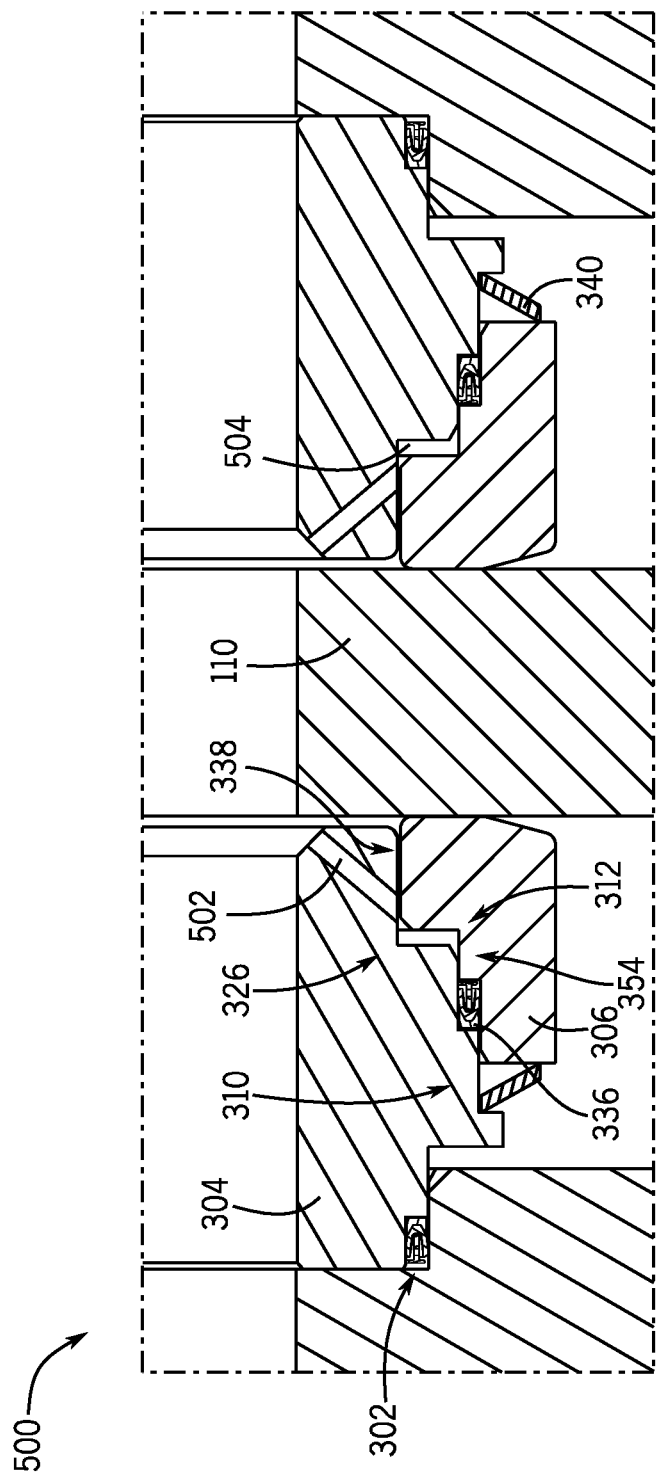
FIG. 5 is a cross-sectional view of an embodiment of a seat arrangement, in accordance with embodiments of the present disclosure.

FIG. 5 is a cross-sectional side view of an embodiment of a seat arrangement 500 that is incorporated into a valve assembly, such as the valve assembly 100. In this example, a gate valve is illustrated with the valve member 110 positioned between the seat arrangement 500. The seat arrangement includes the lower seat 304 positioned within the seat pocket 302 and the upper seat 306 arranged in contact with the lower seat 304 and bearing against the valve member 110. As described above, the illustrated seats 304, 306 include respective profiles 310, 312 to facilitate interaction between the seats 304, 306.

The seat arrangement 500 shown in FIG. 5 includes a flow passage 502 extending through the lower seat 304 and the upper seat 306. The flow passage 502 may be fluidly connected to the bore 124 and direct fluid into the flow path 338 between the lower seat 304 and the upper seat 306. For example, the flow path 338 may extend between the lower seat 304 and the upper seat 306. In this example, the void 504 is arranged between the second upper seat step 354 and the first lower seat step 326. As noted above, fluid may be driven into the void 504 and engage the interface seal 336. As a result, a force is applied to the lower seat 304 that drives the lower seat into the seat pocket 302.

The biasing member 340 is arranged proximate the upper seat 306 in this embodiment and drives the upper seat 306 radially inward toward the valve member 110. In this example, the biasing member 340 is shown as a Belleville washer. Accordingly, contact may be formed between the upper seat 306 and the valve member 110 to block fluid flow after the valve is closed. It should be appreciated that the embodiment shown in FIG. 5 may also utilize the configuration illustrated in FIGS. 3B and 4B where the upper seat 306 fully overlaps the lower seat 304. For example, the position and orientation of the flow path 338 may be adjusted to account for the overlap. In certain embodiments, one or more components may be formed via an additive manufacturing technique to facilitate with formation of the flow path 338 while reducing stresses on the components. Furthermore, additive manufacturing techniques may also enable reduced costs for the components, which as noted above, may be sacrificial components designed for replacement.

Figure 6A:
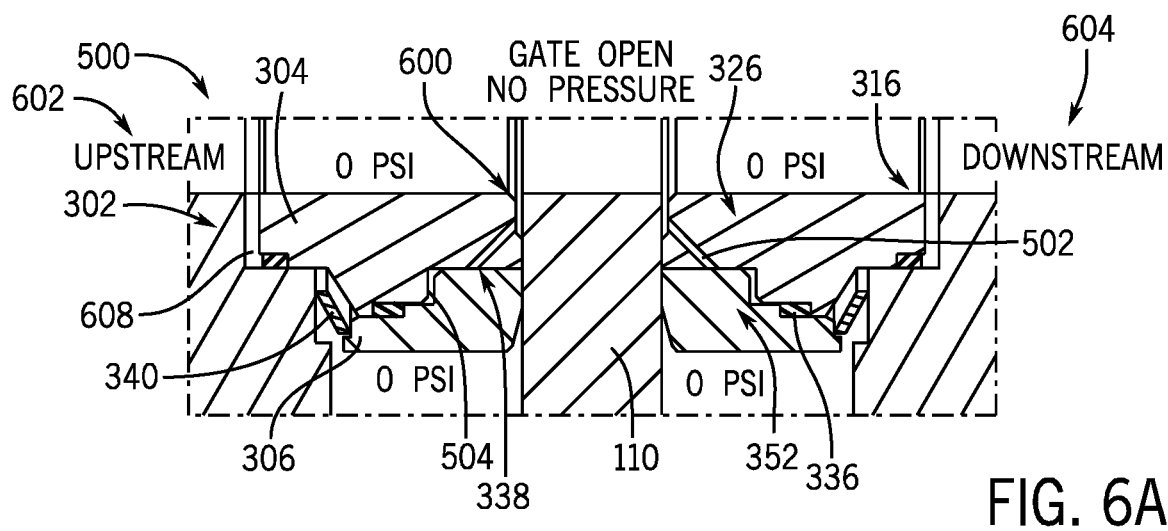
FIGS. 6A-6C are cross-sectional views of an embodiment of a seat arrangement through an opening and closing sequence, in accordance with embodiments of the present disclosure.
Figure 6B:
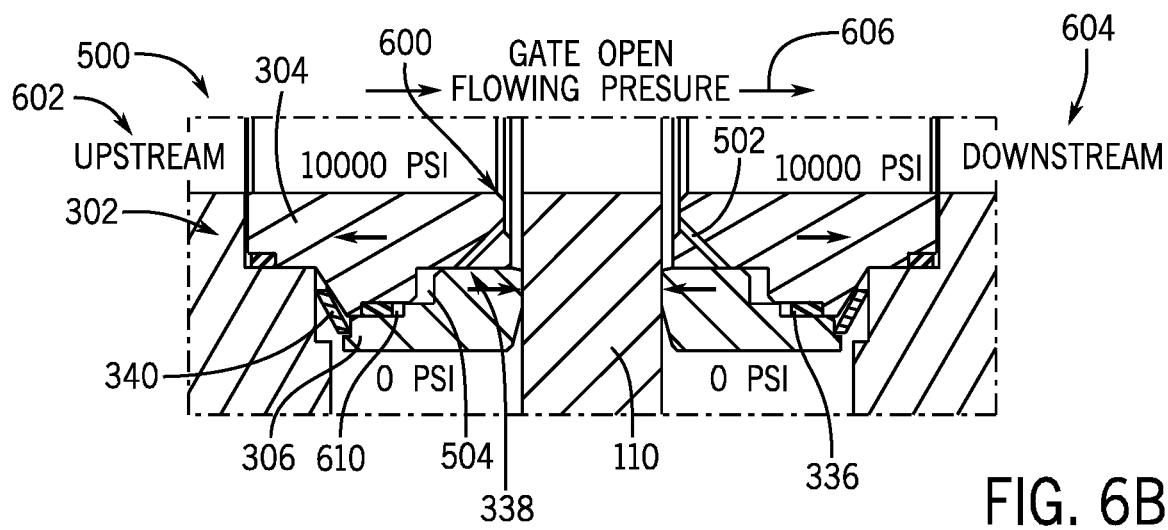
Figure 6C:
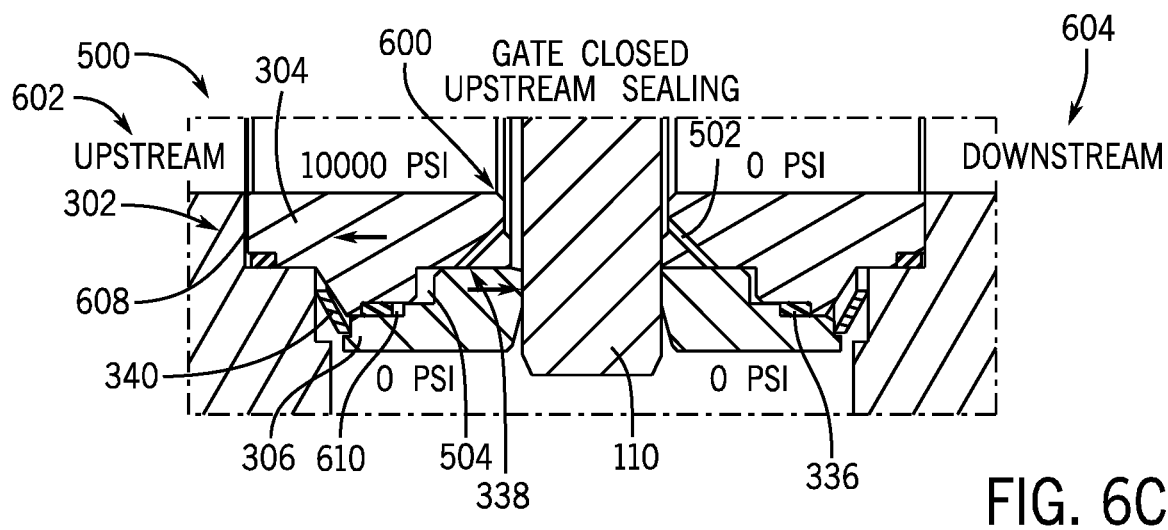

FIGS. 6A-6C are cross-sectional side views of an embodiment of the seat arrangement 500 illustrating a gate open, no pressure position (FIG. 6A), a gate open, pressure condition (FIG. 6B), and a gate closed, upstream sealing position (FIG. 6C). Operation of the seat arrangement 500 will be illustrated in FIGS. 6A-6C throughout a cycle of the valve member 110.

Starting with FIG. 6A, the seat arrangement 500 is illustrated within the seat pocket 302 and includes the lower seat 304 and the upper seat 306. The configuration shown in FIG. 6A includes the upper seat 306 partially overlapping the lower seat 304 such that a first upper seat step 352 is positioned on a first lower seat step 326. In this configuration, the upper seat 306 is driven radially inward toward the valve member 110 via the biasing member 340, which is shown as a Belleville washer. Additionally, in some embodiments, the lower seat 304 may also contact at least a portion of the valve member 500.

The flow path 338 is illustrated extending through the lower seat 304 toward the void 504. In this embodiment, a groove 600 is formed in the lower seat 304 proximate the valve member 110 to provide fluid for the flow path 338 via the passage 502. It should be appreciated that the configuration shown in FIG. 5 may also be utilized with embodiments of the present disclosure and inclusion of the groove 600, position of the passage 502, angle of the passage 502, and the like may be particularly selected based on expected operating conditions. Furthermore, as shown above, there may be embodiments where the flow path 338 does not interact with the passage 502, and rather, is formed at the interface 308. In the example of FIG. 6A, there is no flow along the bore 124 and there is no pressure on either an upstream side 602 or a downstream side 604 of the valve member. Furthermore, the valve member 110 is in an open position and does not extend into the bore 124.

FIG. 6B illustrates the valve member 110 in the open position and also not extending into the bore 124, similar to the orientation of FIG. 6A. However, a fluid flow 606 is introduced into the bore 124 and moves from the upstream side 602 to the downstream side 604. As a result, pressure (e.g., 1000 psi) is one both the upstream side 602 and the downstream side 604.

The introduction of fluid pressure causes a change in the orientation of the lower seat 304. As shown in FIG. 6A, a gap or space 608 is present between the lower seat 304 and the valve body 126, specifically at the seat pocket 302. That is, the second lower seat end 316 does not abut the seat pocket 302 in FIG. 6A. However, the introduction of the fluid flow 606 directs fluid pressure into the groove 600, which is directed further into the void 504 via the flow path 338 and/or the passage 502. As a result, the pressure may act against the interface seal 336, driving the lower seat 304 radially outward and into the seat pocket 302. This is further illustrated in FIG. 6B, where the space 608 is eliminated and an interface space 610 is provided at the seal recess 322. This also causes a separation gap 612 along the first steps 326, 352 as the void 504 expands due to the fluid pressure. The upper seat 306 maintains contact with the valve member 110 due to the radially inward force applied by the biasing member 340. It should be appreciated that similar responses are seen on both the upstream side 602 and the downstream side 604.

FIG. 6C illustrates the valve member 110 transitioned to a closed position, where the upstream side 602 includes the pressure from the fluid flow 606, but the downstream side 604 does not. Accordingly, FIG. 6C illustrates that different responses may occur with respect to the seat arrangement 500. Turning to the upstream side 602, fluid pressure remains in the void 504, which continues to drive the lower seat 304 into the seat pocket 302. As a result, the enlarged void 504 remains along with the space 610. Additionally, the space 608 is also collapsed as the lower seat 304 is driven into the seat pocket 302, thereby preventing fluid into the seat pocket 302 that may lead to wash out.

In contrast to FIG. 6B, FIG. 6C illustrates a different response on the downstream side. Accordingly, the illustrated valve may be referred to as an upstream sealing valve. As noted above, upstream sealing may provide certain advantages, and it should be appreciated that minor changes in the configuration, such as adjusting the size of the interface seal 336 and/or the seat pocket seal 320, may change the valve into a downstream seating valve. FIG. 6C illustrates a smaller void 504 when compared to FIG. 6B due to the lack of pressure on the downstream side. Additionally, the space 610 has been reduced to substantially capture the seal. Contact at the seat pocket 302 remains, as well as contact between the valve member 110 and the upper seat 306.

Figure 7:
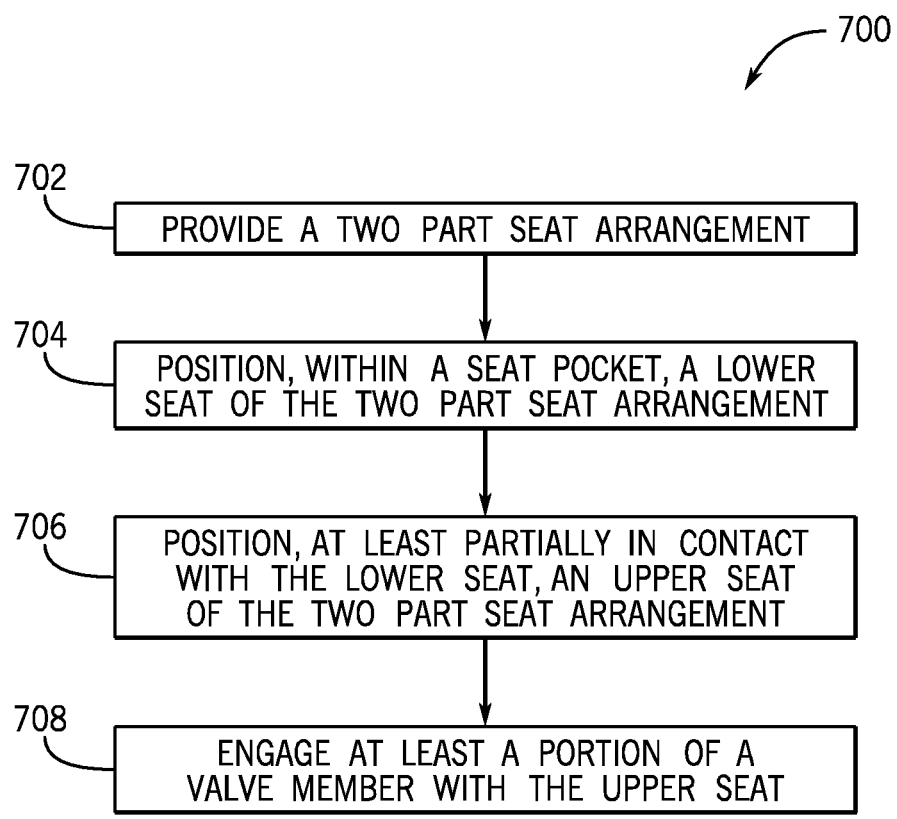
FIG. 7 is a flow chart of an embodiment of a method for installing a seat arrangement, in accordance with embodiments of the present disclosure.

FIG. 7 is a flow chart of an embodiment of a method 700 for installing a seat assembly into a valve. It should be appreciated that for this methods and all methods described herein that there may be more or fewer steps, as well as alternative steps. Additionally, the steps may be conducted in any order, or in parallel, unless otherwise specifically stated. In this example, a two part seat arrangement is provided for installation within a valve body 702. As noted above, the valve body 702 may include a valve body for a gate valve, ball valve, plug valve, or any other reasonable valve that utilizes valve seats. The two part seat arrangement may include an upper seat and a lower seat, with the upper seat at least partially overlapping the lower seat. The lower seat may be installed within a seat pocket 704. In various embodiments, the seat pocket may be formed, at least in part, by the valve body. The upper seat may be installed in contact with the lower seat 706. For example, the upper and lower seats may include respective profiles that facilitate engagement between the components. The profiles may form one or more load shoulders for transferring a force, such as a fluid force at a seal interface or a biasing force from a biasing member. The upper seat may be positioned to engage at least a portion of the valve member 708. For example, the upper seat may be positioned, due to a biasing force, to contact the valve member. In operation, the lower seat may be driven into the seat pocket to prevent fluid ingress, which may cause wash out. Accordingly, erosion or corrosion may be focused on the seat assembly, which may be formed from smaller, cheaper, and easier to replace components.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A valve assembly, comprising:
   a valve body;
   a valve member extending through at least a portion of the valve body, the valve member being movable along a valve cavity axis between an open position and a closed position;

a seat pocket formed in the valve body, the seat pocket forming an annular recess in the valve body; and a seat arrangement positioned at least partially within the seat pocket, comprising:

a lower seat extending radially inward from the annular recess toward the valve cavity axis;

an upper seat at least partially overlapping the lower seat, the upper seat extending radially inward toward the valve cavity axis to contact the valve member along a seat face, wherein the upper seat overlaps the lower seat to block the lower seat from contacting the valve member;

an interface seal positioned along an interface between the upper seat and the lower seat, the interface seal receiving a fluid pressure to drive the lower seat radially outward and into the annular recess; and a biasing member positioned between the lower seat and the upper seat and out of contact from a working fluid associated with the valve body.

2. The valve assembly of claim 1, further comprising:
a flow passage extending through the lower seat, the flow passage directing the fluid pressure toward the interface seal.

3. The valve assembly of claim 2, further comprising:
a groove formed in the lower seat, the groove being fluidly coupled to the flow passage.

4. The valve assembly of claim 1, wherein the lower seat comprises:
a platform formed proximate the annular recess, the platform including a seat pocket recess for receiving a seat pocket seal, the seat pocket seal blocking fluid access into the seat pocket.

5. The valve assembly of claim 1, wherein each of a lower seat profile and an upper seat profile is a stepped profile.

6. The valve assembly of claim 1, further comprising:
a gap between the upper seat and the lower seat, the gap arranged proximate the interface seal, wherein a gap size changes in response to the fluid pressure.

7. A seat arrangement for a valve assembly, comprising:
a lower seat, the lower seat adapted for a seat pocket formed within a valve body, the lower seat having a first lower seat end and a second lower seat end, the second lower seat end having a platform and a seal recess for receiving a seat pocket seal, wherein the lower seat has a lower seat profile extending from the first lower seat end toward the second lower seat end;

an upper seat, the upper seat adapted to at least partially overlap the lower seat, the upper seat having a seat face substantially proximate the first lower seat end and a mating upper seat profile, wherein only the upper seat bears against a valve member of the valve assembly; and a biasing member positioned between the lower seat and the upper seat and out of contact from a working fluid;

wherein a gap formed between the upper seat and the lower seat is configured to receive a fluid pressure that bears against an interface seal.

8. The seat arrangement of claim 7, further comprising:
a flow passage extending through the lower seat, the flow passage directing the fluid pressure toward the gap.

9. The seat arrangement of claim 8, further comprising:
a groove formed in the first lower seat end, the groove being fluidly coupled to the flow passage.

10. The seat arrangement of claim 7, wherein the biasing member drives the upper seat radially away from the second lower seat end.

11. The seat arrangement of claim 7, wherein at least one of the lower seat or the upper seat is formed via an additive manufacturing process.

12. The seat arrangement of claim 7, wherein in response to the fluid pressure, the lower seat is driven radially into the seat pocket, the seat pocket seal bearing against the valve body and blocking fluid flow into the seat pocket.

13. The seat arrangement of claim 7, wherein a seat pocket seal diameter is less than an interface seal diameter.

14. The seat arrangement of claim 7, wherein the seat face is adapted to bear against the valve member of the valve assembly.

15. The seat arrangement of claim 7, wherein the upper seat overlaps the lower seat such that at least a portion of the seat face extends radially beyond the first lower seat end.

16. A method for installing a seat arrangement, comprising:
providing a two part seat arrangement, the two part seat arrangement including a lower seat and an upper seat, each of the lower seat and the upper seat having a respective mating profile;

positioning the lower seat at least partially within a seat pocket formed in a valve body;

positioning the upper seat to at least partially overlap the lower seat to block the lower seat from contacting a valve member;

positioning a biasing member between the lower seat and the upper seat such that the biasing member is out of contact from a working fluid;

engaging the valve member with the upper seat; and sealing the two part seat arrangement within the valve body.

17. The method of claim 16, further comprising:
installing an interface seal between the lower seat and the upper seat; and installing a seat pocket seal within the seat pocket, the seat pocket seal positioned on a platform of the lower seat.

* * * * *